United States Patent
Wu et al.

(10) Patent No.: US 9,534,771 B2
(45) Date of Patent: Jan. 3, 2017

(54) WAVEGUIDE LUMINAIRE WITH GUIDE IMBEDDED ACTIVITY SENSOR

(71) Applicant: ABL IP Holding, LLC, Conyers, GA (US)

(72) Inventors: Xiaoping Wu, Richmond, CA (US); Nicholas R. Trincia, San Francisco, CA (US); Mohammad Zafar Shahbaz, Dublin, CA (US)

(73) Assignee: ABL IP Holding, LLC, Conyers, GA (US)

( * ) Notice: Subject to any disclaimer, the term of this patent is extended or adjusted under 35 U.S.C. 154(b) by 0 days.

(21) Appl. No.: 14/612,197

(22) Filed: Feb. 2, 2015

(65) Prior Publication Data
US 2015/0219825 A1     Aug. 6, 2015

Related U.S. Application Data

(60) Provisional application No. 61/934,643, filed on Jan. 31, 2014.

(51) Int. Cl.
| | |
|---|---|
| *G02B 6/00* | (2006.01) |
| *F21V 23/04* | (2006.01) |
| *F21V 8/00* | (2006.01) |
| *F21Y 101/00* | (2016.01) |

(52) U.S. Cl.
CPC ......... *F21V 23/0471* (2013.01); *G02B 6/0081* (2013.01); *F21V 2200/20* (2015.01); *F21Y 2101/00* (2013.01); *G02B 6/0091* (2013.01)

(58) Field of Classification Search
CPC .. G02B 6/0081; G02B 6/0091; F21V 23/0471
See application file for complete search history.

(56) References Cited

U.S. PATENT DOCUMENTS

| | | | | |
|---|---|---|---|---|
| 6,753,661 | B2 * | 6/2004 | Muthu | G09G 3/3413 315/149 |
| 2009/0058306 | A1 * | 3/2009 | Itaya | G02B 6/0011 315/149 |
| 2011/0175533 | A1 | 7/2011 | Holman et al. | |

OTHER PUBLICATIONS

"Sensorswitch Overview", Acuity Brands promotional flier, Jun. 12, 2012, pp. 1-2, www.sensorswitch.com, US.
"New Lighting Fixture Integrates Occupancy, Daylight Sensors", journal article, Sep. 1999, vol. 8, No. 9, Environmental Building News, www.buildinggreen.com, US.
"Product Overview", Home Depot online catalog, accessed Jan. 27, 2014, Home Depot, www.homedepot.com, US.

(Continued)

*Primary Examiner* — Thomas M Sember
(74) *Attorney, Agent, or Firm* — Beeson Skinner Beverly, LLP

(57) ABSTRACT

An edge-fed waveguide luminaire includes a light waveguide having a planar body, a waveguide edge support structure, and an anchor opening in the planar body of the light waveguide, which is displaced from said waveguide edge support structure. A sensor is fixed in the anchor opening of said light waveguide so as to be responsive to conditions in the space below the luminaire. The sensor, which will have minimal impact on the aesthetic qualities of the luminaire, is in communication with light switching means for adjusting the light output from the luminaire in response to changes in conditions in the space below the luminaire.

10 Claims, 5 Drawing Sheets

(56) References Cited

OTHER PUBLICATIONS

"CFL Lampholder", Leviton online catalog, accessed Jan. 27, 2014, Leviton, www.leviton.com, US.
"Built-in Sensing Device 6W LED motion sensor bulb", Alibaba online catalog, accessed Jan. 27, 2014, Alibaba, www.alibaba.com.

* cited by examiner

WAVEGUIDE LUMINAIRE WITH GUIDE IMBEDDED ACTIVITY SENSOR

CROSS-REFERENCE TO RELATED APPLICATIONS

This application claims the benefit of U.S. Provisional Application No. 61/934,643 filed Jan. 31, 2014, which is incorporated herein by reference.

BACKGROUND

The present invention generally relates to fixtures for illuminating a space and more particularly to luminaires having built-in activity sensors for controlling the light output from the luminaire.

Luminaires having embedded occupancy sensors to control the levels of the luminaire are well known. Such sensors detect occupancy within the space, such as by detecting motion and/or sound, and are used to control lighting levels in the illuminated spaces based on occupancy levels. Using such embedded sensors, energy savings can be realized by switching the lights off or to lower lighting levels when the space is unoccupied.

Sensors are typically mounted to the structure of the luminaire that houses or supports the luminaire's light source or sources and optical elements, such as lenses, louvers and reflectors used to create a desired light distribution and to control brightness. However, problems in locating and mounting a sensor can arise when the luminaire has insufficient structure on which to mount the sensor or when the supporting structure for the luminaire's optical elements is configured such that the sensor cannot easily be located to provide suitable coverage for detecting occupancy in areas in the vicinity of the luminaire. Furthermore, sensors located on luminaire housings and other support structures can be visually distracting, particularly when the luminaire is a prominent architectural element within a space.

The present invention provides a waveguide luminaire having one or more sensors that can be mounted to the luminaire without the limitations imposed by the sometimes small profile support structures for the luminaire's waveguide or waveguides. The sensor or sensors can be optimally located on the luminaire for effective coverage within the space being illuminated and will have minimal impact on the aesthetic qualities of the luminaire.

SUMMARY OF INVENTION

The invention is directed to an edge-fed waveguide luminaire for illuminating a space comprising a light waveguide having a substantially planar body, waveguide edges, a visible bottom surface and a top surface. The planar body of the waveguide can extend in a flat plane or a curved plane. The light waveguide has light extraction means, such as one or more microprismatic layers or surfaces for extracting light fed into the light waveguide through at least the guide's visible bottom surface to produce direct lighting. However, light could in addition be extracted through the guide's top surface to produce both direct and indirect lighting.

The light waveguide is supported by an edge support structure from which the luminaire is mounted or suspended. An anchor opening is provided in the planar body of the light waveguide, and a sensor having a front lens portion and a rear base portion is fixed in the anchor opening such that the lens portion faces out from the bottom surface of the waveguide and the base portion is positioned behind the top surface of the waveguide. The anchor opening is displaced from the waveguide edge support structure such that the lens portion of the sensor, which faces the space below the luminaire, appears to "float" on the waveguide. The sensor is responsive to conditions in the space below the luminaire, and communicates with light switching means for adjusting the light output from the luminaire in response to changes in conditions in the space below the luminaire. The sensor can be an occupancy sensor or other type of sensor, such as a light level sensor.

In one aspect of the invention, the base or rear body portion of the sensor located above the waveguide is provided in a dark color, preferably black, and any structure surrounding the lens portion of the sensor located below the waveguide is provided in a light color, preferably, white. Selection of colors for these respective parts of the sensor will minimize the visual obtrusiveness of the sensor: when the luminaire is turned on, the base will not be seen and the front lens portion of the sensor will tend to disappear in the luminous bottom surface of the light waveguide; when the luminaire is turned off or to very low luminance levels, the base of the sensor produce a defined shadow which frame the front sensor's light front lens portion.

DETAILED DESCRIPTION OF ILLUSTRATED EMBODIMENT

Figure 1:
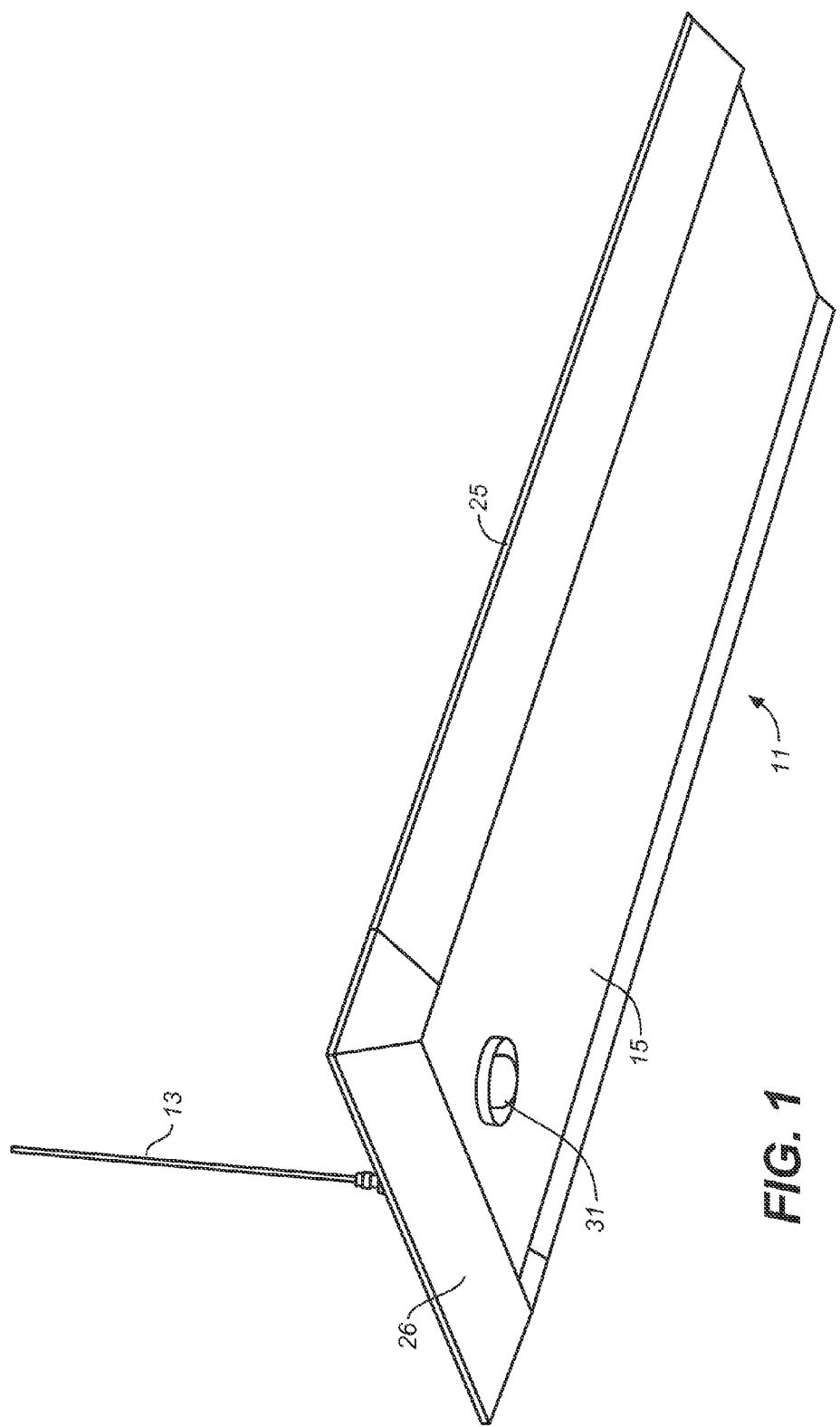
FIG. 1 is a bottom perspective view of a waveguide luminaire with an occupancy sensor in accordance with the invention.

Referring now to the drawings, an edge-fed waveguide luminaire 11 for illuminating a space is shown as a ceiling suspended luminaire suspended by suspension cables, such as by aircraft cable 13. However, it shall be understood that a luminaire in accordance with the invention could be supported in a space by other means, such by one or more brackets for mounting the luminaire to a wall or to furniture, or by mounting the luminaire on a stand. As further explained below, the luminaire can be a direct luminaire or a direct-indirect luminaire.

The illustrated luminaire 11 is comprised of an elongated light waveguide 15 having a substantially planar body 17 and waveguide edges 19, 20. The planar body of the waveguide has a visible bottom surface 21 and a top surface 23, the separation of which defines the thickness of the waveguide. The planar body can extend in a flat plane or a curved plane, with its planar characteristics being defined by substantially parallel top and bottom surface capable of piping light fed from the edge of the guide through the guide's width or length until the light is extracted. The light waveguide has light extraction means for extracting light fed into the light waveguide through at least the guide's visible bottom surface. However, light could in addition be extracted through the guide's top surface to produce both down light and up light for producing both direct and indirect lighting.

The light waveguide is supported by an edge support structure from which the luminaire is mounted or suspended. The illustrated edge support structure is a frame 25 that surrounds the edges of the waveguide, but could be a support structure that extends along only a portion of the waveguide perimeter, for example, along the just opposite long edges 19 of the waveguide. In this case, light is fed into the waveguide by small light sources, such as LED's 27, distributed along the inside of the long edges of the frame 25.

Luminaire 11 uniquely has a "floating" sensor located directly on the light waveguide for sensing activity or light conditions in the space below the luminaire. To achieve this, an anchor opening 29 which is displaced from frame 25 is provided in the planar body of the light waveguide. Sensor 31 having a front lens portion 33 and a rear base 35 is fixed in this anchor opening such that the lens portion of the sensor faces down in the direction of the space that the sensor is intended to cover. Because the anchor opening is displaced from the waveguide support frame, the visible lens portion of the sensor will appear to "float" on the waveguide. The sensor is responsive to conditions in the space below the luminaire, and communicates with light switching means, such as sensor control box 57 shown in FIG. 5, for adjusting the light output from the luminaire in response to changes in conditions in the space below the luminaire. For example, if the sensor is an occupancy sensor, it will be advantageously positioned to face directly down into the space for detecting activity below the luminaire, which may include areas both directly below the luminaire and in the vicinity of the luminaire. If the sensor is a light level sensor, light conditions within the zone immediately below the luminaire will be detected. More than one sensor could be fixed to the light waveguide by providing more than one anchor opening in the waveguide body 17. For example, an occupancy sensor could be located near one end of the waveguide body and a light level sensor near the other end of the waveguide body.

The base 35 of the sensor, which is located above the waveguide, can be provided in a dark color, preferably black. Conversely, any structure surrounding the visible lens portion of the sensor located below the waveguide can be provided in a light color, preferably, white. In the illustrated embodiment, the sensor's visible lens portion is in the form of a lens 37 and a snap ring 39 used to hold the sensor on the waveguide body 17. When the luminaire is turned on, this visible lens portion will tend to disappear due to the brightness produced across the bottom surface 21 of the light waveguide by the light extracted from the guide. The dark base will similarly not be seen as it is behind the lit waveguide. When the luminaire is turned off, or to very low luminance levels, the sensor assembly will be visible but will provide an aesthetically interesting feature of the luminaire, as it will be seen as floating on the clear waveguide. Locating the sensor on a centerline of the waveguide will provide symmetry to the visual appearance of the waveguide. When the light in switched off, the base of the sensor will produce a defined shadow on the waveguide which will be seen as framing the sensor's lens assembly.

To prevent a visually distracting glows of light around the inside edges 30 of the anchor opening 29 for the sensor, the inside edges are preferably coated with a black opaque ink, paint or similar coating. For example, this can be accomplished by running a black marker pen over the inside edges. Preferably, the anchor opening is laser cut into the waveguide body to prevent any irregularities around the edges of the opening that might create bright spots on the guide.

Figure 2:
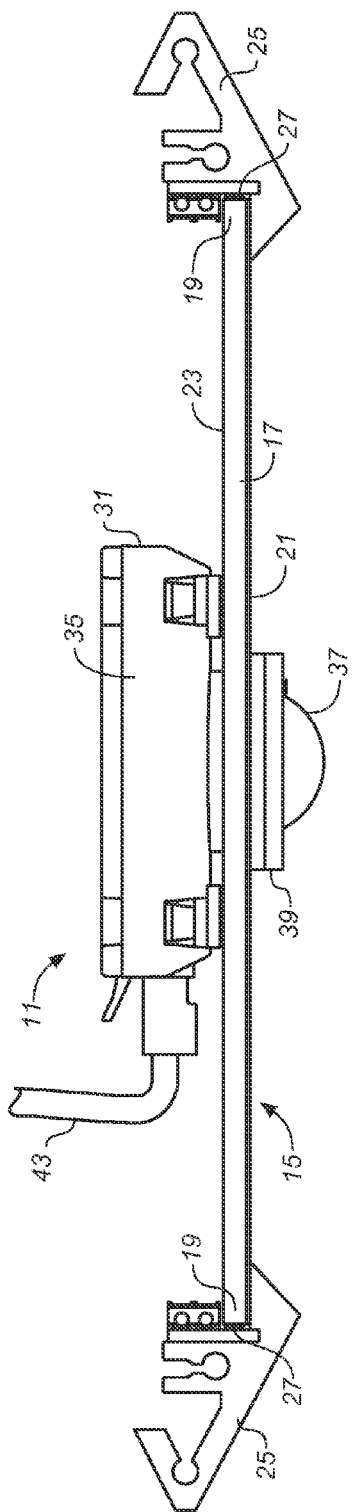
FIG. 2 is a side elevational view thereof with the support structure for the luminaire waveguide partially cut-away.
Figure 2A:
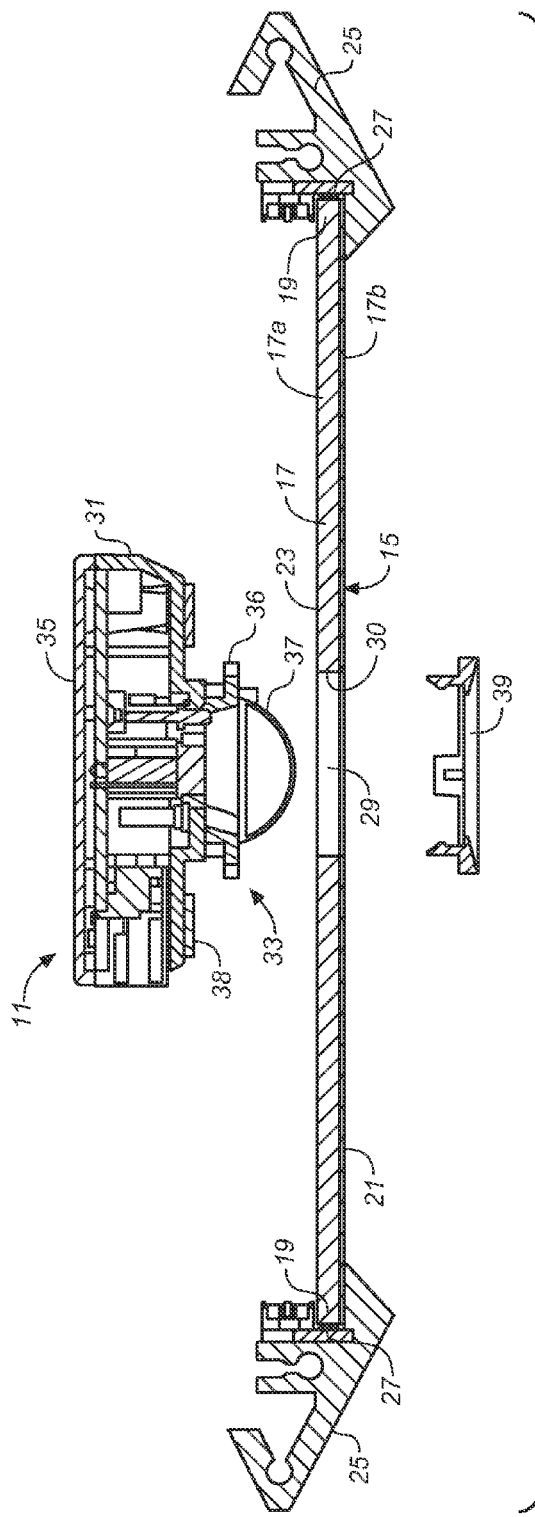
FIG. 2A is another side elevational view thereof with occupancy sensor exploded away from the luminiaire's light waveguide.

Installation of the sensor 31 on the waveguide body 17 is illustrated in FIG. 2A, wherein the sensor is shown positioned above anchor opening 29 with its lens end 34 oriented toward the anchor opening. The lens 34 is placed do onto the top surface 23 of the guide body 17 such that the lens 37 and lens collar ring 36 pass through the anchor opening. Snap ring 39 can then be snapped into place on the lens collar ring from below to fix the sensor on the waveguide. A resilient gasket 38 can be placed on the underside of the sensor base to stabilize the sensor base on the top of the waveguide.

An example of a sensor 31 that can be used in a waveguide luminaire in accordance with the invention is an nLight nES PDT 7 occupancy sensor manufactured by SensorSwitch of Wallingford, Conn. The light waveguide is a transparent guide suitably and can have, for example, a total thickness of around 0.16 inches, with two layers, a top layer (designated 17a in FIG. 2A) and a very thin bottom layer (designated 17b in FIG. 2A). Both can be fabricated of a clear acrylic plastic, bottom layer having microstructures that alter the light distribution pattern to prevent glare. The top surface of the top layer forms the top surface 23 for the waveguide body and can be etched on as to scatter the internally reflected source light being piped down the guide from the waveguide edges. As is well known in the art such etched guide surfaces provide a means of extracting light from the waveguide. The guide's top surface 23 can be transparent to allow some light to be scattered upwardly and some light to be scattered downwardly to produce both indirect and direct lighting.

Figure 3:
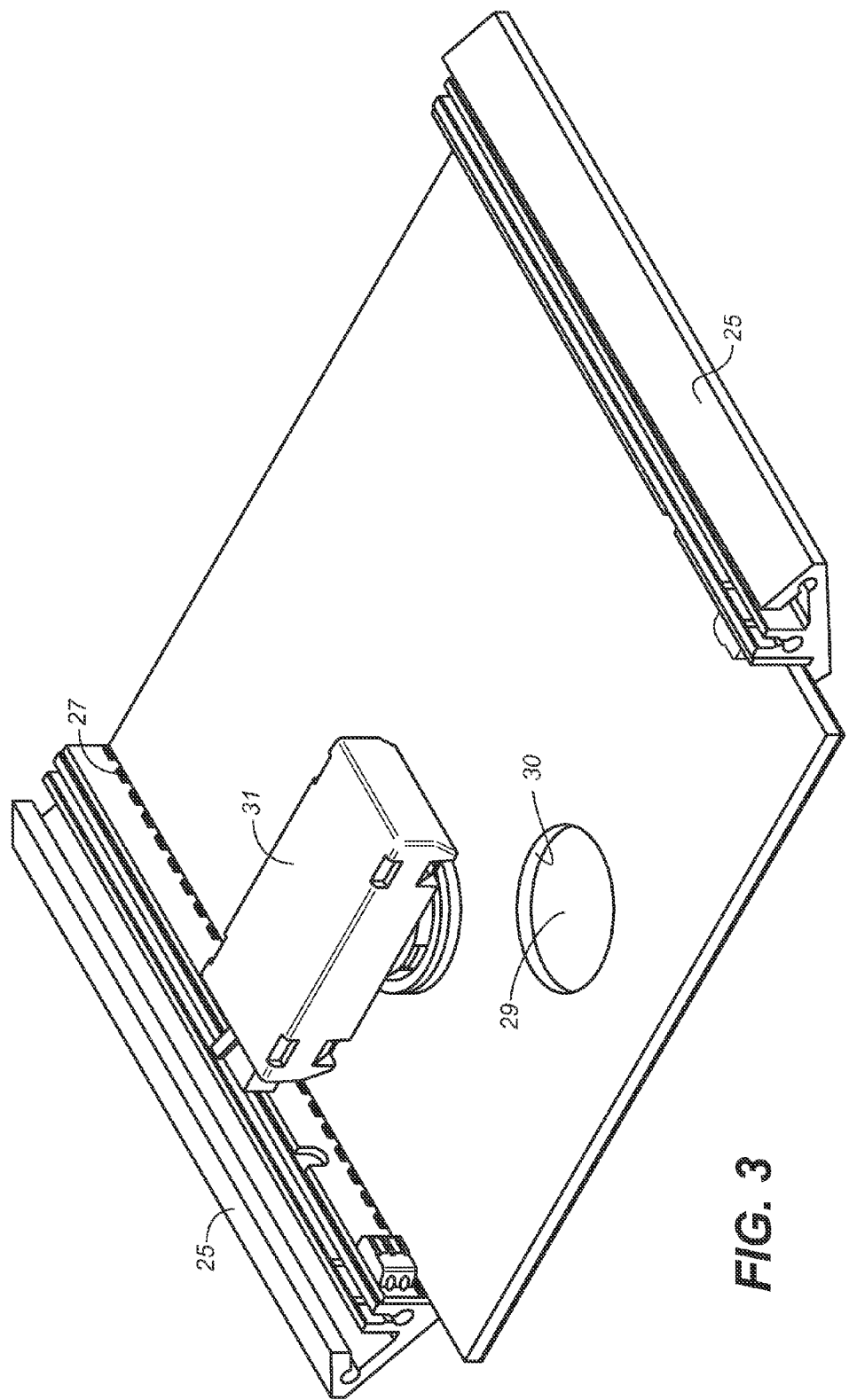
FIG. 3 is top fragmentary view thereof with the sensor base exploded above the waveguide.
Figure 4:
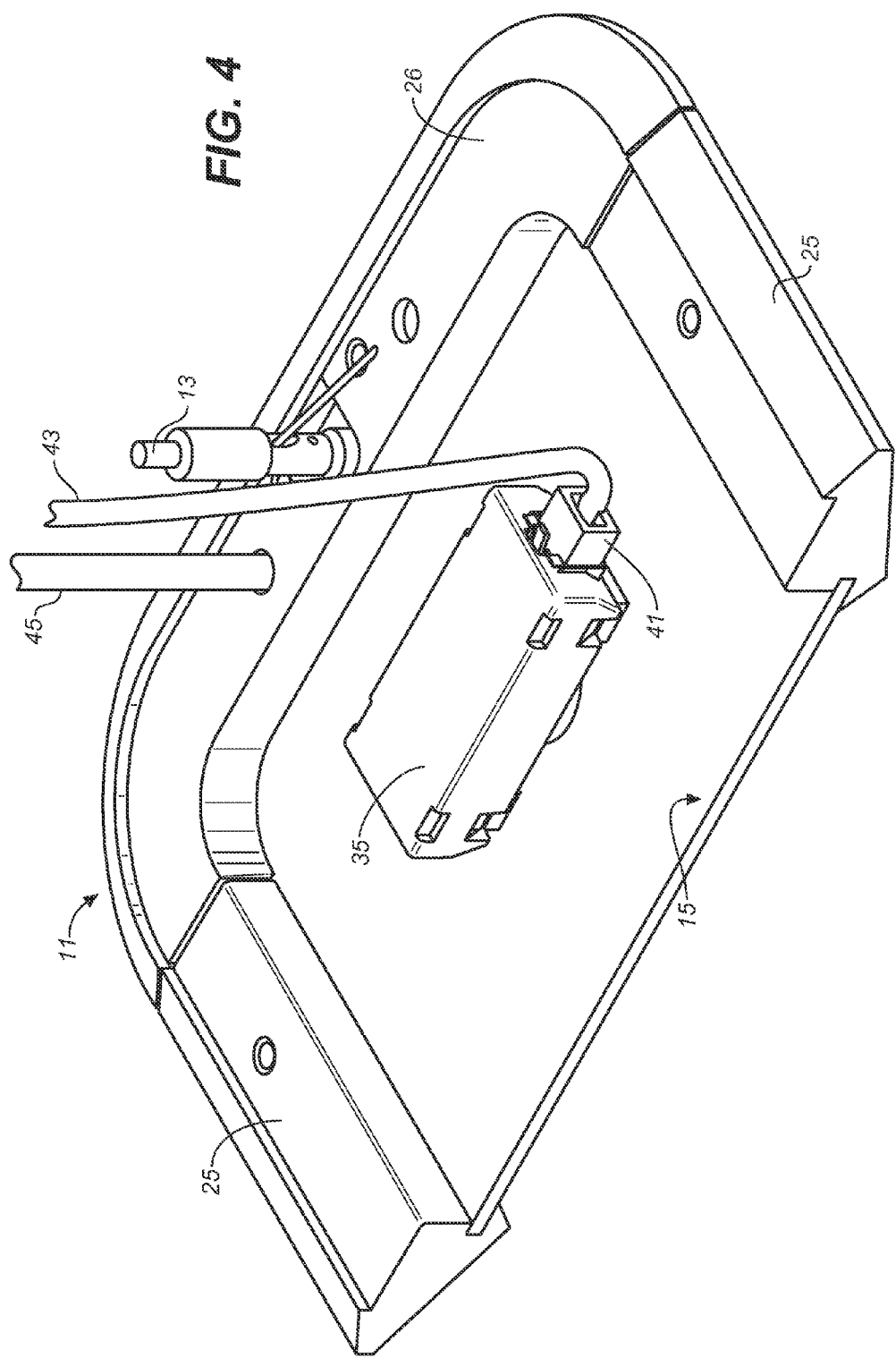
FIG. 4 is a top perspective view thereof showing a sensor cable plugged into the base of the sensor.
Figure 5:
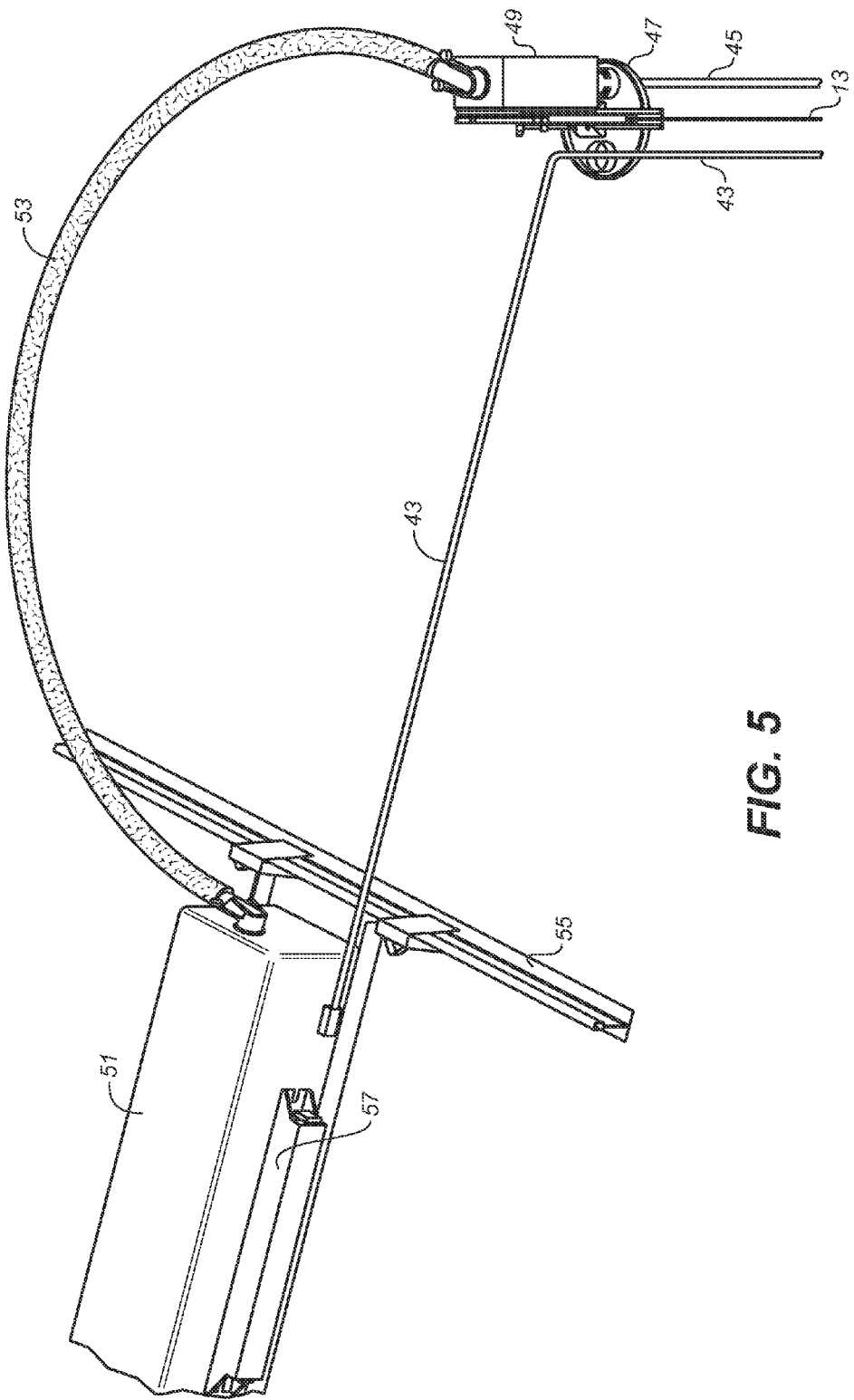
FIG. 5 is a view a T-grid of a grid ceiling showing the connections of the suspension, power feed and sensor cables threaded up through the ceiling at a suspension point, and a ballast box and sensor power pack located above the ceiling.

FIGS. 4 and 5 show how the sensor 31 of luminaire 11 is wired to a power supply and sensor control above a grid ceiling from which the luminaire can be suspended. On FIG. 4 the frame 25 has a slightly but immaterially different configuration than the frame for the luminaire shown in FIGS. 1-3.) Shown in FIG. 4 is the rear base 35 of the sensor 31 located behind light waveguide 15. The sensor's rear base has a cat-5 receptacle for receiving a cat-5 connector 41 at the end of a sensor drop line 43. Also shown is the luminaire power cord 45 and a suspension point 45 from which the luminaire is suspended at one end by an aircraft cable 13.

Referring to FIG. 5, aircraft cable 13, sensor drop line 43, and power cord 45 are all threaded up through a ceiling canopy 47 (the ceiling is not shown), with the above-ceiling end of the power cord being connected to junction box 49, which in turn is connected to ballast box 51 via cable 53. Only two T-bars 55, 56 of a T-bar ceiling grid are shown: T-bar 55 is shown supporting one end of the ballast box and T-bar 56 is shown above the ceiling canopy. The junction box is attached to T-bar 56 as is the above-ceiling end of the suspending aircraft cable. The sensor line is wired to the sensor control box 57 attached to the side of ballast box 51. Sensor control box 57 provides a switching means for adjusting the light output from the luminaire in response to changes in conditions in the space below the luminaire detected by sensor 31.

While the invention has been described in considerable detail in reference to the accompanying drawings, it will be understood that it is not intended that the invention be limited to such detail.

We claim:

1. An edge-fed waveguide luminaire for illuminating a space, said luminaire comprising a light waveguide having a substantially planar body, waveguide edges, a visible bottom surface and a top surface, and further having light extraction means for extracting light fed into the light waveguide through at least the bottom surface thereof, a waveguide edge support structure, an anchor opening in the planar body of said light waveguide displaced from said waveguide edge support structure, a sensor fixed in the anchor opening of said light waveguide, said sensor being adapted to sense conditions in the space below the luminaire and being in communication with light switching means for adjusting the light output from the luminaire in response to changes in conditions in the space below the luminaire.

2. The luminaire of claim 1 wherein said anchor opening is laser cut in the planar body of said light waveguide.

3. The luminaire of claim 1 wherein said anchor opening forms interior opening edge walls and wherein said interior edge walls are substantially covered by an opaque coating.

4. The luminaire of claim 1 wherein said sensor includes a rear body portion positioned behind the top surface of the light waveguide and a front lens portion visible against the bottom surface of the light waveguide.

5. The luminaire of claim 4 wherein the rear body portion of said sensor is dark in color.

6. The luminaire of claim 4 wherein the rear body portion of said sensor is black.

7. The luminaire of claim 4 wherein a surround structure is provided below the waveguide such that the surround structure surrounds the visible front lens portion of said sensor, and wherein said surround structure presents visible surfaces that are light in color.

8. The luminaire of claim 7 wherein the visible surfaces of said surround structure are white.

9. The luminaire of claim 7 wherein said surround structure is a snap ring which engages the rear body portion of the sensor through the anchor opening of said light waveguide.

10. An edge-fed waveguide luminaire for illuminating a space, said luminaire comprising a light waveguide having a substantially planar body, waveguide edges, a visible bottom surface and a top surface, and further having light extraction means for extracting light fed into the light waveguide through at least the bottom surface thereof, a waveguide edge support structure, an anchor opening in the planar body of said light waveguide displaced from said waveguide edge support structure, and a sensor fixed in the anchor opening of said light waveguide for sensing conditions in the space below the luminaire, said sensor being in communication with light switching means for adjusting the light output from the luminaire in response to changes in conditions in the space below the luminaire, wherein said anchor opening forms interior opening edge walls and wherein said interior edge walls are substantially covered by an opaque coating, and wherein said sensor includes a rear body portion positioned behind the top surface of the light waveguide and a front lens portion visible against the bottom surface of the light waveguide, and the rear body portion of said sensor is dark in color.

* * * * *